(12) United States Patent
Allen et al.

(10) Patent No.: US 10,164,306 B2
(45) Date of Patent: Dec. 25, 2018

(54) BATTERY CELL HAVING INWARD EXTENDING CUP EDGE AND METHOD OF MANUFACTURE

(71) Applicant: Energizer Brands, LLC, St. Louis, MO (US)

(72) Inventors: Jeremy L. Allen, Westlake, OH (US); Robert M. Janmey, Columbia Station, OH (US)

(73) Assignee: Energizer Brands, LLC, Saint Louis, MO (US)

( * ) Notice: Subject to any disclaimer, the term of this patent is extended or adjusted under 35 U.S.C. 154(b) by 781 days.

(21) Appl. No.: 14/081,319

(22) Filed: Nov. 15, 2013

(65) Prior Publication Data

US 2015/0140456 A1    May 21, 2015

(51) Int. Cl.
| H01M 12/08 | (2006.01) |
| H01M 2/02 | (2006.01) |
| H01M 12/06 | (2006.01) |
| H01M 10/04 | (2006.01) |

(52) U.S. Cl.
CPC ......... *H01M 12/08* (2013.01); *H01M 2/0222* (2013.01); *H01M 2/0227* (2013.01); *H01M 12/06* (2013.01); *H01M 10/0427* (2013.01); *Y02E 60/128* (2013.01)

(58) Field of Classification Search
CPC ............. H01M 2/0222; H01M 2/0465; H01M 2/0413; H01M 2/026; H01M 2/02; H01M 2/04; H01M 2220/30; H01M 4/54; H01M 6/04; H01M 12/08; H01M 12/06; H01M 2/0227; H01M 10/0427; H01M 2/0225; H01M 2/023; Y02E 60/128

See application file for complete search history.

(56) References Cited

U.S. PATENT DOCUMENTS

| 3,310,436 | A |   | 3/1967 | Ralston et al. |
| 3,907,593 | A | * | 9/1975 | Marincic ................. H01M 6/12 361/501 |
| 4,240,197 | A | * | 12/1980 | Hamsag .............. H01M 2/0413 29/623.2 |
| 5,603,157 | A | * | 2/1997 | Lake ................... H01M 2/0222 29/623.1 |

(Continued)

FOREIGN PATENT DOCUMENTS

| DE | 102011078611 A1 | 1/2013 |
| GB | 2059141 A | 4/1981 |

(Continued)

OTHER PUBLICATIONS

International Search Report from International Application No. PCT/US2014/065756 dated Feb. 4, 2015, 4 pages.

*Primary Examiner* — Michael L Dignan
(74) *Attorney, Agent, or Firm* — Alston & Bird LLP

(57) ABSTRACT

An electrochemical battery cell is provided having a housing formed by a can and a cup, with a sealing gasket disposed therebetween. First and second electrodes and electrolyte are disposed within the housing. The cup has a peripheral wall and a cup edge portion that extends inward, away from the can wall at angle less than 180° relative to a longitudinal axis of the cell housing. The gasket likewise has a base that extends inward, and a surface of the cup edge portion is sealingly engaged with the gasket base.

10 Claims, 4 Drawing Sheets

(56) References Cited

U.S. PATENT DOCUMENTS

| | | | | |
|---|---|---|---|---|
| 5,642,561 A * | 7/1997 | Tuttle | ............... | H01M 2/0222 29/623.2 |
| 5,662,718 A * | 9/1997 | Tuttle | ............... | H01M 2/0222 29/623.1 |
| 5,945,230 A * | 8/1999 | Oltman | ............... | H01M 2/0222 429/174 |
| 2002/0102458 A1 * | 8/2002 | Maleki | ............... | H01M 2/0222 429/217 |
| 2005/0064283 A1 * | 3/2005 | Anderson | ............... | H01M 2/0222 429/174 |
| 2007/0128495 A1 * | 6/2007 | Bobowick | ............... | H01M 2/0222 429/406 |
| 2008/0075995 A1 | 3/2008 | Janmey | | |
| 2009/0325062 A1 * | 12/2009 | Brenner | ............... | H01M 2/0222 429/174 |
| 2010/0119935 A1 * | 5/2010 | Kim | ............... | H01M 2/347 429/164 |
| 2012/0028110 A1 | 2/2012 | Brenner | | |
| 2012/0164545 A1 * | 6/2012 | van Rensburg | ............... | H01M 2/0202 429/407 |

FOREIGN PATENT DOCUMENTS

| | | |
|---|---|---|
| JP | 61055857 | 3/1986 |
| JP | 08190900 | 7/1996 |
| JP | 2000058139 A | 2/2000 |
| JP | 2000353503 A | 12/2000 |
| JP | 2004327200 A | 11/2004 |
| JP | 2005302394 A | 10/2005 |
| JP | 2006004698 A | 1/2006 |
| WO | 2006001788 A1 | 1/2006 |

* cited by examiner

BATTERY CELL HAVING INWARD EXTENDING CUP EDGE AND METHOD OF MANUFACTURE

FIELD OF THE INVENTION

The invention is generally related to electrochemical battery cells with an improved cell design and the manufacture thereof.

BACKGROUND OF THE INVENTION

For many electronic devices, particularly small hand-held devices, there is a desire to make the devices as small as possible. This means that it is important for batteries used in battery-operated devices to also be as small as possible. At the same time, device users wish to minimize the frequency with which the batteries must be replaced. Consequently, there is an ongoing need to provide small batteries with higher energy efficiency. At the same time, minimizing the battery cost is a goal.

The energy efficiency of electrochemical battery cells can be maximized by minimizing the number of cell components and the volume of each to provide as much internal cell volume as possible for active materials and electrolyte. One approach has been to use a cell housing with electrically conductive housing members in direct contact with the cell electrodes as the battery terminals. A seal member such as a gasket or grommet is often used to electrically insulate the two battery terminals and provide a compressive seal therebetween. Examples of such cell designs are found in typical button and coin cells, as well as somewhat larger cells.

To achieve a good, reliable seal that is resistant to electrolyte leakage, moisture loss, air ingress and so on, the electrically conductive housing members must have sufficient strength to prevent damage when cell closing forces are applied during cell manufacture and maintain a compressive force on the seal member during cell storage and use. In general, the more massive the housing members, the stronger they are, but less internal cell volume is available. Stronger materials are often more expensive, and material choices are also limited by other requirements, such as resistance to corrosion from internal cell ingredients and the external cell environment.

In view of the above, it is desirable to provide an electrochemical battery cell with an increased internal volume for the electrodes and electrolyte, having a housing made from a conductive material of reduced thickness and sufficient strength to provide an excellent seal. It is further desirable to provide an electrochemical battery cell with improved sealing characteristics and excellent leakage resistance.

SUMMARY OF THE INVENTION

An improved battery cell is provided and disadvantages of the prior art are overcome in an electrochemical battery cell with a housing including a can, a cup and a sealing gasket, with a wall of the gasket disposed between walls of the can on the outside and the cup on the inside. Positive and negative electrodes are in contact with the can and the cup, respectively, which serve as cell external contact terminals. The edge of the cup extends inward to provide a large contact surface with an adjacent inward-extending base of the gasket. This prevents damage to the gasket base upon application of an axial force to the cup, provides a large sealing surface between the cup edge and the gasket base, and provides hoop strength to the wall of the cup to resist deformation by a radial force. These features provide excellent sealing of the cell housing, with long shelf life and good resistance to salting and leakage of electrolyte from the cell. The hoop strength provided by the cup edge may allow the use of a thin cup material and/or the use of alternative cup material to reduce material costs and/or provide increased internal volume for the cell electrodes and electrolyte.

Accordingly, one aspect of the present invention is an electrochemical battery cell including a first electrode and a second electrode, a separator disposed between the electrodes, and an electrolyte, and a cell housing having an electrically conductive metal can, an electrically conductive metal cup, and a gasket disposed between the can and the cup in which the electrodes, separator and electrolyte are disposed. The first electrode is in contact with the can, and the second electrode is in contact with the cup. Each of the can, the cup and the gasket includes a base and a peripheral wall extending from the base. The wall of each of the can and the cup has an edge portion with an edge defining an open end. The gasket wall is disposed between and sealingly engaged with the can and cup walls, with the can wall disposed on the outside of the gasket wall and the cup wall disposed on the inside of the gasket wall. The cup edge portion and the gasket base extend inward, away from the can wall at an angle less than 180° relative to a longitudinal axis of the cell housing, and a surface of the cup edge portion is sealingly engaged with the gasket base.

Embodiments of the aforementioned aspect of the invention can include any one or a combination of the following features:

- the cup edge portion forms an angle in the range of 45° to 135° relative to the longitudinal axis of the cell housing; the angle can be at least 45°; the angle can be no greater than 135° and in one embodiment is approximately 90°;
- the edge portion of the cup applies a biasing force toward the can base; the biasing force can bias the gasket base against the first electrode; the biasing force can bias the gasket base against the can base;
- the cup is made of a metal; the metal can be a clad material; the clad material can be a biclad material; the biclad material can include stainless steel and copper, with the copper on the inside of the cell; the clad material can be a triclad material; the triclad material can include nickel in an outside layer, copper in an inside layer, and stainless steel in a layer between the inside and outside layers;
- the cup is a plated cup; the cup can be a post-plated cup, with plating covering the edge of the cup; the plating can include a metal with a higher hydrogen overpotential than copper; the plating can be one or a combination of metals selected from copper, tin, zinc and indium and chromium; the plating can be an alloy containing copper, tin and zinc;
- the cell is a button cell;
- a round or prismatic cell whose maximum external height between the can base and the cup base is less than the maximum external width of the can;
- the first electrode is a positive electrode, and the second electrode is a negative electrode;
- the cell is a metal air cell, and the positive electrode is a catalytic oxygen reduction electrode; the negative electrode can include a metal selected from zinc, aluminum and lithium, or an alloy thereof; the electrolyte can be an aqueous electrolyte; the aqueous electrolyte can be an alkaline electrolyte; the alkaline electrolyte can contain one or a combination of potassium hydroxide, sodium hydroxide and lithium hydroxide; the aqueous electrolyte can be an acidic electrolyte; the acidic electrolyte can include one or a combination of ammonium hydroxide, ammonium chloride and zinc chloride.

According to another aspect of the present invention, an electrochemical battery cell is provided that includes a cell housing having a first housing component and a second housing component, the first housing component having a first peripheral wall, and the second housing component having a second peripheral wall and an edge portion extending therefrom. A first electrode is disposed within the cell housing in electrical contact with the first housing component, and a second electrode is disposed within the cell housing in electrical contact with the second housing component. A gasket is disposed between the first and second housing components, the gasket having a base and a peripheral wall extending from the base, wherein the edge portion of the second housing component and the gasket base extend inward, away from the first peripheral wall of the first housing component at an angle less than 180° relative to a longitudinal axis of the cell housing, and a surface of the edge portion of the second housing component sealingly engages with the gasket base.

Embodiments of this aspect of the invention can include any one or a combination of the following features:
the edge portion of the second housing component extends inward at the angle in the range of 45° to 135° relative to the longitudinal axis of the cell housing;
the edge portion of the second housing component extends inward at the angle in the range of 75° to 105° relative to the longitudinal axis of the cell housing;
the edge portion of the second housing component extends inward at the angle of approximately 90° relative to the longitudinal axis of the cell housing;
a round or prismatic cell whose maximum external height between the can base and the cup base is less than the maximum external width of the can; and
the second electrode is a fluid consuming electrode and the cell housing comprises at least one fluid entry port for passage of fluid into the housing to the fluid consuming electrode.

According to a further aspect of the invention, a method of making an electrochemical cell is provided which includes a first electrode and a second electrode, a separator disposed between the electrodes, and an electrolyte, and a cell housing having an electrically conductive can, an electrically conductive cup, and a gasket disposed between the can and the cup in which the electrodes, separator and electrolyte are disposed. The method includes the step disposing the first electrode in the electrically conductive can having a base and a peripheral wall extending from the base, and forming the cup from an electrically conductive material so the cup has a base and a peripheral wall extending from the base, the peripheral wall including an edge portion terminating with an edge, and the edge portion being formed inward at an angle less than 180° relative to a longitudinal axis of the cell housing. The method further includes the steps of disposing the second electrode in the cup, assembling the gasket between the cup and the can, the cup having a base and a peripheral wall extending from the base, and assembling the can onto the cup so that the gasket provides a seal between the can and cup.

Embodiments of this further embodiment can include any one or a combination of the following features:

the cup edge portion forms an angle in the range of 45° to 135° relative to the longitudinal axis of the cell housing;
the cup edge portion forms an angle in the range of 75° to 105° relative to the longitudinal axis of the cell housing;
the cup edge portion forms an angle of approximately 90° relative to the longitudinal axis of the cell housing;
a round or prismatic cell whose maximum external height between the can base and the cup base is less than the maximum external width of the can;
the edge portion of the cup applies a biasing force toward the can base, wherein the biasing force biases the gasket base against one of the first electrode and the can base.

These and other features, advantages and objects of the present invention will be further understood and appreciated by those skilled in the art by reference to the following specification, claims and appended drawings.

Unless otherwise specified, the following definitions and methods are used herein:
the outside of the cell refers to the portions of the cell housing exposed to the external environment, and the inside of the cell refers to the contents disposed within the closed cell as well as the portions of the housing facing and in contact with the cell contents;
"inward" and "outward" are directions relative to the inside and the outside of the cell, respectively;
"top," "bottom," "up," "down," "left" and "right" are directions and locations with respect to the cells as oriented in the drawings;
"radial" is horizontal and "axial" is vertical with respect to the cells as oriented in the drawings;
the longitudinal axis of the cell housing is the axis extending centrally through the base of the cup and the base of the can as shown by line $L_A$ in FIG. 5; and
the internal volume of a cell is the volume defined by the inner surfaces of the cell housing.

Unless otherwise specified herein, all disclosed characteristics and ranges are as determined at room temperature (20-25° C.).

DESCRIPTION OF THE PREFERRED EMBODIMENT

The present invention is useful in an electrochemical battery cell having a positive electrode, a negative electrode and an electrolyte, all contained within a cell housing. The cell housing has two electrically conductive housing members, each in physical and electrical contact with one of the electrodes, and an electrically nonconductive gasket with a wall disposed between walls of the housing members. The housing members serve as the external electrical contact terminals of the cell. With reference to the portion of the housing in which opposite surfaces of the gasket wall are in contact with the two housing members, the housing member in contact with the outer surface of the gasket is referred to as a can, and the housing member in contact with the inner surface of the gasket is referred to as a cup. In certain embodiments the positive electrode is in contact with the can and the negative electrode is in contact with the cup, and in other embodiments the negative electrode is in contact with the can and the positive electrode is in contact with the cup. The size and shape of the cell are not limited. For example, the cell can be a small button or coin cell, or it can be larger; and it can have a round or prismatic cross-sectional shape.

Figure 2:
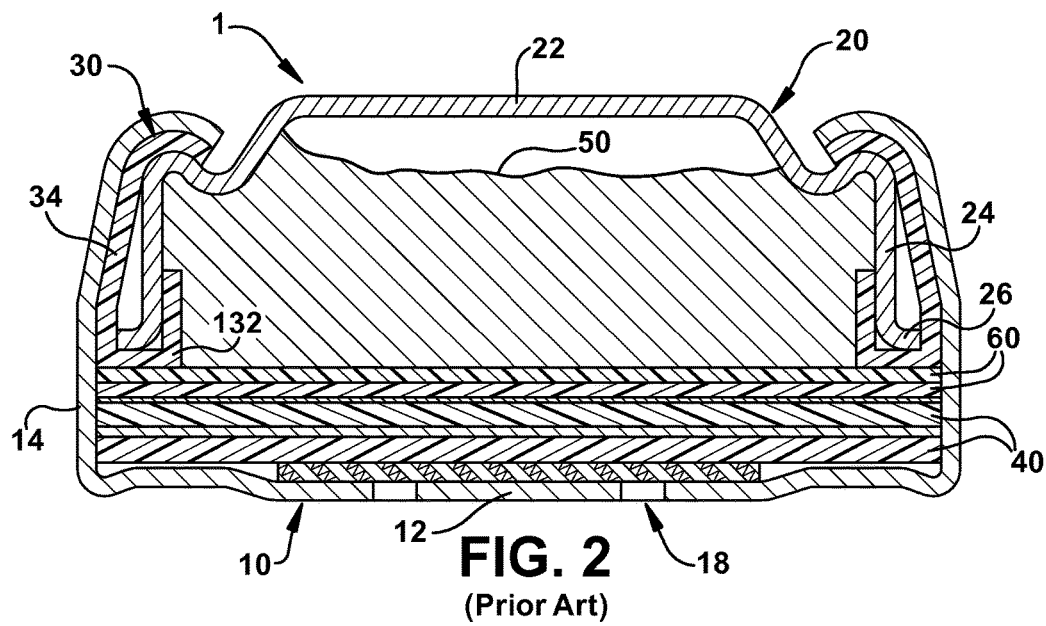
FIG. 2 is a full sectional elevational view of a second embodiment of a prior art electrochemical battery cell.
Figure 3:
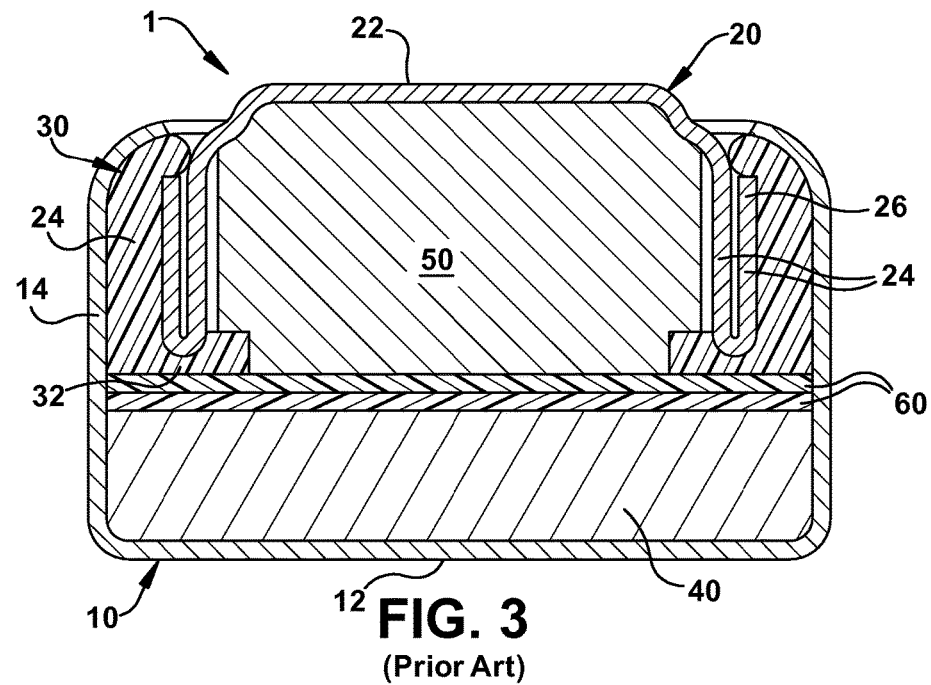
FIG. 3 is a full sectional elevational view of a third embodiment of a prior art electrochemical battery cell.
Figure 4:
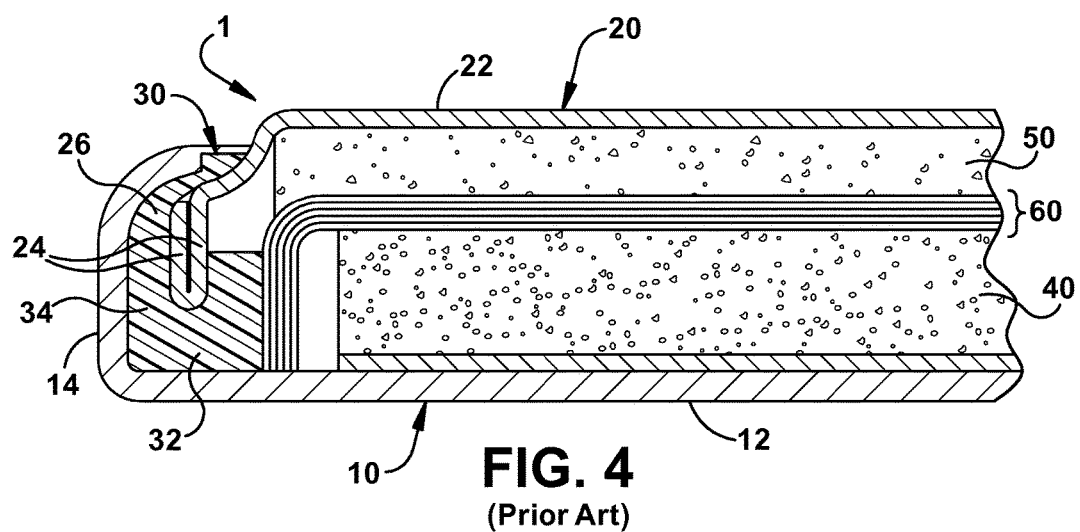
FIG. 4 is a full sectional elevational view of a fourth embodiment of a prior art electrochemical battery cell.

Examples of electrochemical battery cells in the prior art with terminals in direct contact with the cell electrodes are shown in FIGS. 1 to 4. Each of the cells 1 has a housing including a can 10, a cup 20 and a gasket 30, each of which has a wall 14, 24, 34 extending from a base 12, 22, 32. The can wall 14 is on the outside of the cell 1, and the cup wall 24 is on the inside of the cell 1. The gasket wall 34 is disposed between the can and cup walls 14 24. The inner and outer surfaces of the gasket wall 34 are in contact with adjacent surfaces of the can and cup walls 14, 24 to close the cell housing and provide a compression seal. Contained within the housing are a first electrode 40, a second electrode 50, a separator 60 between the electrodes 40, 50, and an electrolyte (not shown). The first electrode 40 is in physical and electrical contact with the can 10, and the second electrode 50 is in physical contact with the cup 20. The gasket base 32 is disposed between the cup wall 24 and the first electrode 40. The can wall 14 applies a radial force against the adjacent gasket and cup walls 34, 24, creating compressive seals between the gasket wall 34 and the can and cup walls 14, 24. The can wall 14 also applies an axial force against the gasket and cup walls 34, 24, creating a seal between the gasket base 32 and the adjacent portion of the cup wall 24, as well as a seal between the gasket base 32 and either the peripheral portion of the first electrode 40 (FIGS. 1 to 3) or the can base 12 (FIG. 4). The prior art cups 20 can be one of several configurations. The cup wall 24 can have an edge portion 26 that is generally perpendicular to the cup base 22 and has an edge pressed against the gasket base 32 (FIG. 1), it can have an edge portion 26 that is turned outward (FIG. 2), or it can be folded over so the edge portion 26 is adjacent and generally parallel to the portion of the cup wall 24 between the edge portion 26 and the cup base 22.

Each of the cell designs in FIGS. 1 to 4 has advantages and disadvantages. The cell in FIG. 1 maximizes the internal volume available for the second electrode and electrolyte, but the radial strength is relatively low, and the edge of the cup wall can be sharp, with a risk of cracking or cutting through the gasket base. The cells in FIGS. 2 to 4 have a cup wall with greater radial strength and a blunter edge, but less internal volume available for the second electrode.

Figure 1:
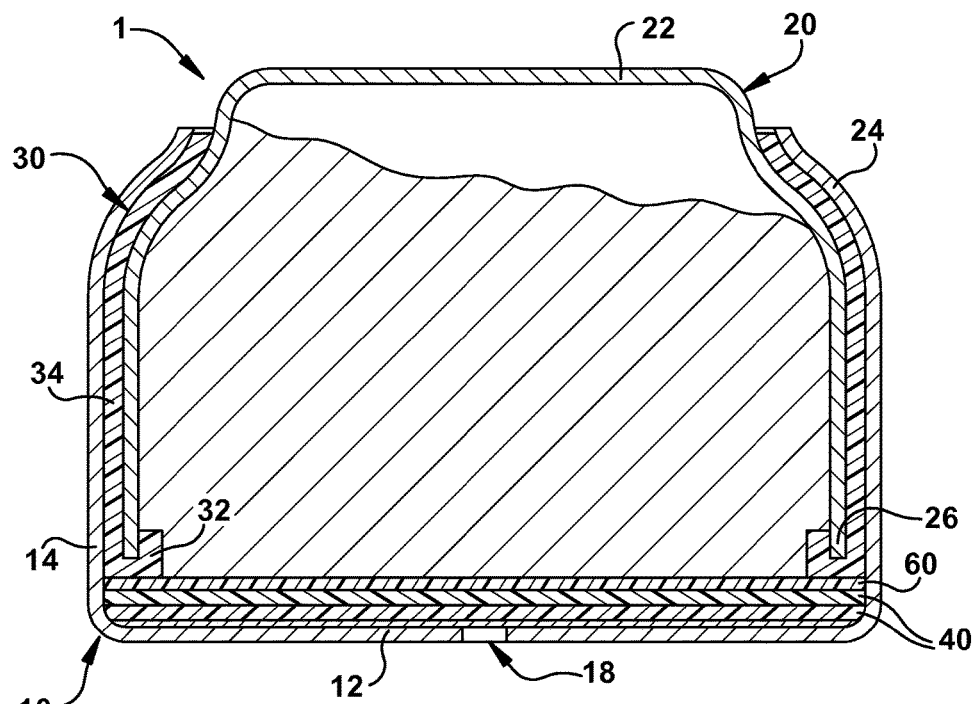
FIG. 1 is a full sectional elevational view of a first embodiment of a prior art electrochemical battery cell.

Although the cells shown in FIGS. 1 to 4 are each typical of certain cell types (FIGS. 1 and 2—button and prismatic metal-air cells respectively, with one or more ports 18 in the can base 12 through which air can enter from outside the cell 1; FIGS. 3 and 4—button and coin cells with all electrode active materials contained within the sealed cells), the designs shown are not limited in usefulness to those cell types. These cell designs are shown to illustrate several different conventional cup wall configurations shown in the prior art.

In cells according to various embodiments of the present invention, the cup wall or second housing component is modified by tuning its edge portion inward at an angle less than 180°. Compared to the cell in FIG. 1, this provides added hoop strength to the cup wall to resist radial forces applied against or by the can wall during and after cell manufacturing. However, unlike the conventional cells in FIGS. 2 to 4, there is little reduction in the internal cell volume available for the second electrode compared to the cell in FIG. 1.

The present invention can provide several benefits. By increasing the resistance of the cup wall to radial forces, the cup thickness can be reduced to make more cell internal volume available for the second electrode without sacrificing seal effectiveness and reliability, an alternative cup material that is less expensive but not as strong can be substituted without sacrificing seal effectiveness and reliability, or the seal effectiveness and reliability can be improved without sacrificing the cell internal volume available for the second electrode; or some of the benefit of two or more of these characteristics may be possible. Because the portion of the cup wall that is disposed against the gasket base does not have a sharp edge, or even a somewhat sharp corner as can be the case with a cell like the one in FIGS. 3 and 4, the risk of damage to the gasket base due to the application of an axial force to the cup is reduced. This can allow a reduction in the thickness of the gasket base with no increased risk of damage, thereby increasing the internal cell volume. Like the cell in FIG. 2, the cell according to various embodiments of the present invention also provides a larger axial sealing surface between the cup wall and the gasket base. Additionally, the length of the gasket base in the cell according to the present invention can be increased with a much smaller impact on the internal cell volume than in a cell like the one in FIG. 2. These benefits with regard to axial sealing can be especially important, since axial sealing can play a greater role than radial sealing in the overall seal effectiveness of the cell. Furthermore, the present invention can reduce a common problem found in metal-air cells—bowing of the air electrode away from the can base (sometimes referred to as "doming" of the air electrode), which reduces the internal cell volume available for the other electrode. Doming can be caused by inward radial forces on the edges of a metal screen or expanded metal current collector in the air cell, due to the tight fit of the current collector in the can to provide good electrical contact. The inward extending cup and gasket base can apply a downward biasing force on the air electrode and reduce the size of the opening through which the air electrode can bow to reduce doming.

Figure 5:
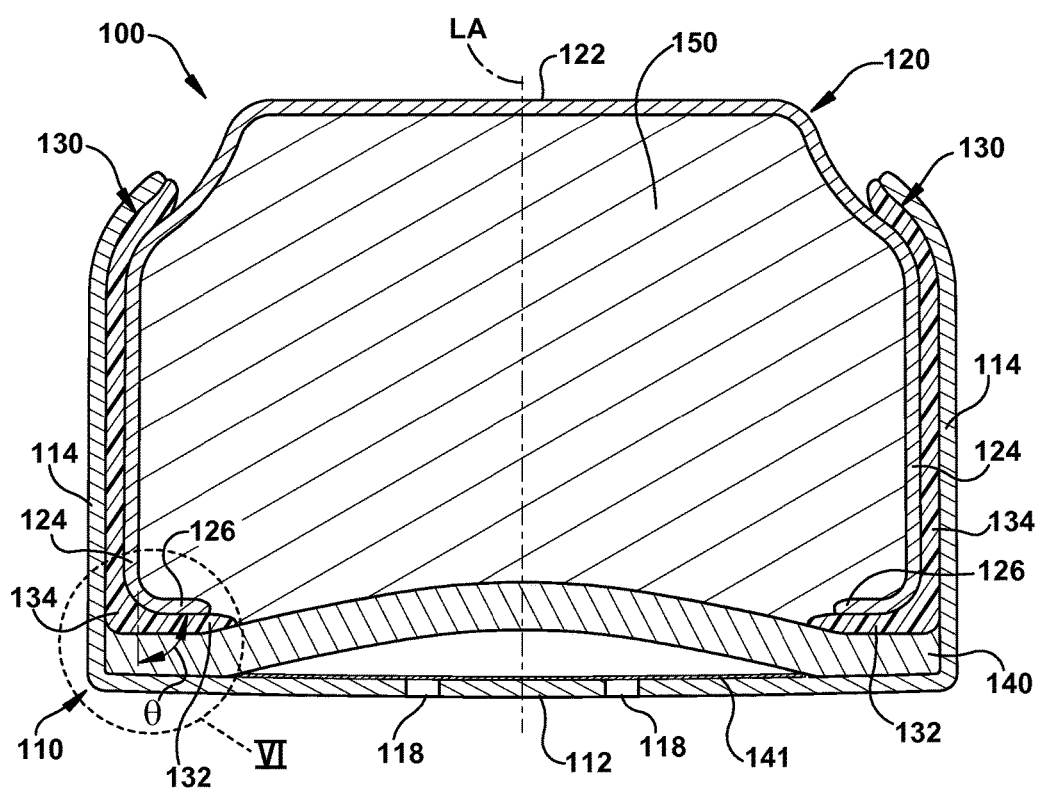
FIG. 5 is a full sectional elevational view of an electrochemical battery cell, according to one embodiment of the present invention.

Referring to FIG. 5, an electrochemical battery cell 100 is shown according to one embodiment of the present invention. The cell 100 has a housing including an electrically conductive metal can 110, an electrically conductive metal cup 120, and a dielectric gasket 130 disposed between the can 110 and cup 120. The metal can 110 has a generally flat bottom base 112 with one or more openings 118 for allowing air or oxygen to enter the cell 100 to reach a fluid consuming electrode and an upstanding peripheral wall 114. Openings 118 may or may not be provided in the can base 112 depending on the type of cell (e.g., fluid consuming cell or non-fluid consuming cell). The metal cup 120 has a peripheral wall 124 extending from a base 122 and a cup edge portion 126 extending inward away from the can wall 114. The gasket 130 has an upstanding wall 134 extending from a base 132. The gasket wall 134 is disposed between the can and cup walls 114 and 124. The outer and inner surfaces of the gasket wall 134 are in contact with the adjacent surfaces of the can and cup walls 114 and 124, respectively, to close the cell housing and provide a compression seal. Contained within the housing is a first electrode assembly 140 which may include a first electrode (e.g., positive electrode also referred to as the cathode) and a separator. In one embodiment, the first electrode is a fluid consuming electrode. A paper layer 141 may be disposed between the first electrode assembly 140 and opening 118 in can base 112 to allow air to diffuse or distribute across the underside of the first electrode assembly 140. Also contained within the housing is a second electrode 150 (e.g., negative electrode, also referred to as the anode). The separator is disposed between the first and second electrodes, and electrolyte (not shown) is present. The first electrode of assembly 140 is in physical and electrical contact with the metal can 110, and the second electrode 150 is in physical and electrical contact with the metal cup 120. The gasket base 130 is disposed between the inward extending wall 126 of cup 120 and the electrode assembly 140 containing the first electrode and separator. The can wall 114 applies a radial force against the adjacent gasket 130 and cup wall 124, creating compression seals between the gasket wall and the can and cup walls. It should be appreciated that the first electrode assembly 140 may include separate assemblies of the first electrode, the separator, and other components, instead of the single assembly as shown.

In one embodiment of the present invention, the cup wall has a generally L-shape, with a generally horizontal portion of the "L" bent or directed inward, away from the can wall at an angle of approximately 90° relative to the cup wall 124. The generally horizontal portion (the cup edge portion) 126 extends inward and away from the can wall 114 at an angle θ less than 180° relative to a longitudinal axis of the cell housing. The longitudinal axis is defined as the axis extending centrally through the base 122 of cup 120 and the base 112 of the can 110 as shown by line $L_A$. Angle θ is shown measured about the vertical axis of the vertical extending wall 124 of the cup 120 and reflects the angle of bend from the cup side wall to form the inward extending cup edge portion 126. The cup edge portion 126 is bent to form an angle θ of at least 45° and/or 135° or less, and more preferably at an angle θ is in the range of 45° to 135° relative to the longitudinal axis $L_A$ of the cell housing, according to a further embodiment. In other embodiments, the cup edge portion is formed at an angle θ of at least 75° and/or 105° or less, and may be in range of 75° to 105° relative to the longitudinal axis of the cell housing. In one embodiment, cup edge portion 126 forms an angle θ of approximately 90° relative to the longitudinal axis of the cell housing.

The cup edge portion 126 is bent to form an angle θ with the longitudinal axis $L_A$ of the cup that is perpendicular to an imaginary plane disposed against the open end of the cup 120. Angle θ is an obtuse angle when the cup edge portion 126 is directed toward the cup base 122 and θ is an acute angle when the cup edge portion 126 is directed away from the cup base 122. If the angle θ is too large, axial forces will tend to be concentrated too close to the outermost section of the horizontal portion, with an increased risk of damage to the gasket base and a reduction in axial seal effectiveness. If the angle θ is too small, axial forces will tend to be concentrated too close to the innermost section of the horizontal portion, with an increased risk of damage to the gasket base or damage to the first electrode. In one embodiment, the angle θ is less than 90° so the cup edge portion 126 can function more effectively as a spring to apply a biasing axial force against the gasket base 132 and provide a more effective axial seal. The biasing force may bias the gasket base 132 against the first electrode assembly 140 and/or against the can base 112. In actual cups the corners will generally not be sharp, and surfaces will tend to not be flat. An imaginary line may be used to represent the cup base when measuring angle θ. During cell manufacture, angle θ may change as a result of the forces applied to the cup. For example, the cup edge portion 126 may be deflected toward the cup base 122, increasing the angle θ. Preferably, permanent deformation of the cup 120 during and following cell manufacture will be minimal in order to maintain a good seal over a long period of time. The cup material(s) can be selected accordingly.

The gasket base 132 also extends inward, both to electrically insulate the cup 120 from the can 110 and the first electrode and to provide a seal with the cup edge portion 126 and an adjacent surface of the first electrode assembly 140 or the can base 112. The top surface of the base 132 of the gasket 130 as manufactured can be essentially horizontal or angled away from horizontal. For example, the top surface of the gasket base 132 can be angled, e.g., to match angle θ of the cup edge portion 126. The bottom surface of the gasket base 132 can be essentially horizontal or angled away from horizontal. Consequently, the thickness of the base 132 of the gasket 130 as manufactured can be uniform or nonuniform. Preferably the thickness of the base 132 of gasket 130 is 0.10 mm (0.004 in.) to 0.41 mm (0.016 in.), according to one embodiment. The thickness of the gasket 130, particularly the base 132, may be reduced when employing the inward extending cup edge portion 126 due to the rounded and/or flattened surface of the bent cup edge portion 126. As a result, less volume is consumed by the gasket and more internal volume is available for active materials. It is desirable to make the gasket as thin as can be reliably manufactured (e.g., about 0.10 mm (0.004 in.) using an injection molding process), while still having sufficient strength and sealing properties to resist damage during and following cell assembly and to provide a reliable seal over the desired temperature range. To limit the volume of the gasket and provide greater internal cell volume, the gasket thickness (wall and base) is preferably no greater than 0.41 mm (0.016 in.), more preferably no greater than 0.20 mm (0.008 in.), and most preferably no greater than 0.15 mm (0.006 in.).

Figure 6A:
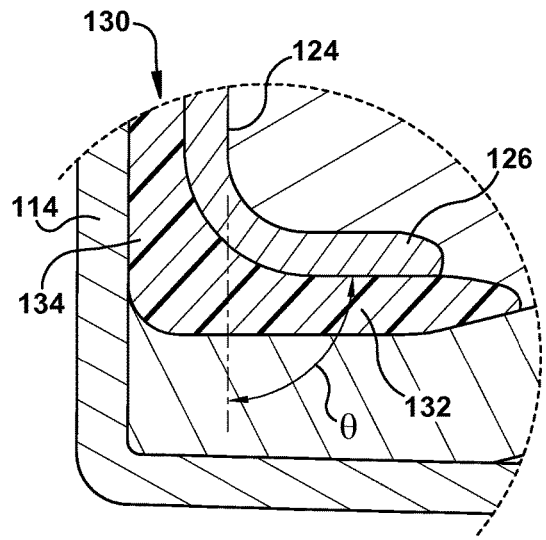
FIG. 6A is a schematic representation of a sectional elevational view of section VI of FIG. 5 showing a portion of a cup and a gasket extending inward, according to one embodiment.
Figure 6B:
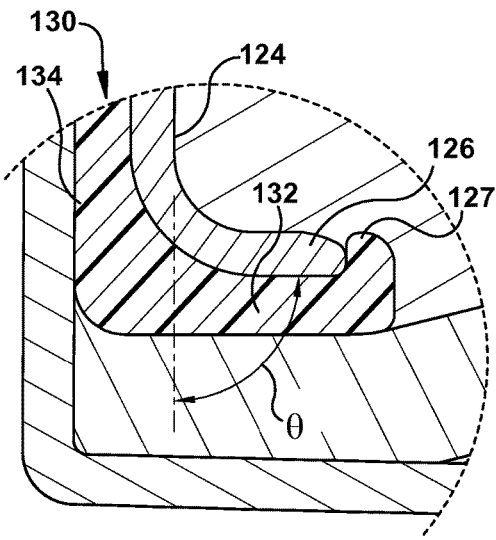
FIG. 6B is a schematic representation of a sectional elevational view of a portion of a cup and gasket extending inward, according to another embodiment.
Figure 6C:
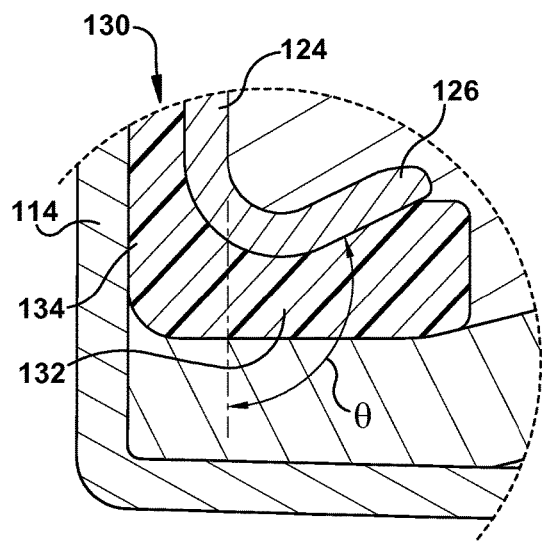
FIG. 6C is a schematic representation of a sectional elevational view of a portion of a cup and gasket extending inward, according to a further embodiment.
Figure 6D:
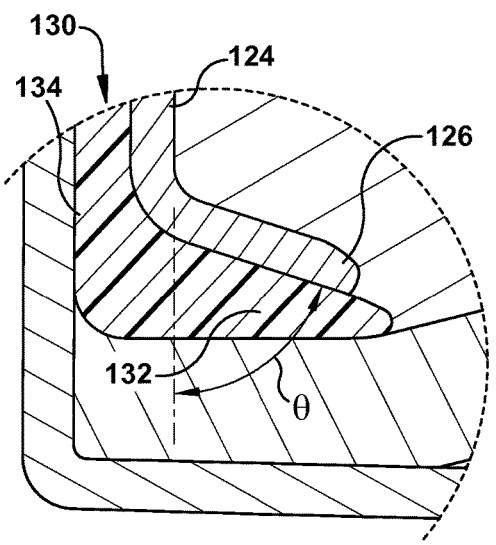
FIG. 6D is a schematic representation of a sectional elevational view of a portion of a cup and gasket extending inward, according to yet a further embodiment.

FIGS. 6A to 6D show enlarged portions of the gasket 130 and cup 120 of a cell according to various embodiments of the invention. In each of these embodiments, the cup edge portion 126 of the cup 120 extends inward from the adjacent portion of the cup wall 124 at an angle θ from vertical, and the gasket base 132 extends inward from the gasket wall 134. As shown in FIGS. 6A to 6D, the cup wall 124 above base 126 is vertical such that it is aligned with the longitudinal axis $L_A$, and the angle θ is formed between the vertical cup wall 124 and the cup edge portion 126. It will be understood that the cup wall 124 may not necessarily be vertical, in which cases the angle θ is between the vertical longitudinal axis $L_A$ and the edge portion 126. The angle θ is about 90° in the embodiments shown in FIGS. 6A and 6B. In the embodiment shown in FIG. 6C the angle θ is greater than 90°, and in the embodiment shown in FIG. 6D the angle θ is less than 90°. In FIG. 6B the gasket base 132 includes an upward extension 127 at the outer end. If the gasket base 132 extends inward not substantially farther than the edge of the cup peripheral portion 126 (FIGS. 6A, 6C and 6D), the internal volume available for the second electrode of the cell is large. In FIGS. 6A to 6D the upper surface of the gasket base 132 is in contact with the adjacent lower surface of the cup peripheral portion 126, and the lower surface of the gasket base 132 is horizontal, reflecting the relationships in a manufactured cell in which the gasket base 132 is disposed against an electrode or can base with a horizontal surface. The surfaces of the gasket base 132 may differ somewhat prior to cell manufacture. It will also be understood that, while corners of the gasket and cup are shown as being somewhat generally sharp and the surfaces are shown as being generally straight, actual manufactured parts may tend to have rounded corners, and surfaces may tend to deviate from straight.

The cup 120 may have a thickness in the range of 0.10 mm to 0.33 mm (0.004 in. to 0.013 in), preferably no greater than about 0.15 mm (0.006 in.). The can may have a thickness in the range of 0.10 mm to 0.25 mm (0.004 in. to 0.010 in.), preferably no greater than about 0.20 mm (0.008 in.). The cup and can materials have good electrical conductivity and will have sufficient strength to maintain adequate sealing forces against the gasket 130 over a long period of time. The material itself can be resistant to attack by the cell contents or external environment, and/or the cup 120 and can 110 materials can be plated with a corrosion resistant material. Examples of cup materials that are known in the art include stainless steel and other steels, copper, and clad materials, particularly those including a steel layer. For aqueous alkaline cells a preferred material is a clad material with a middle layer of stainless steel, an outer layer of nickel and an inner layer of copper. Examples of can materials that are known in the art include stainless steel and other steels and copper. For aqueous alkaline cells suitable plating materials include zinc, indium, chromium, tin, copper and alloys thereof, such as alloys of copper and one or both of tin and zinc.

The gasket material is selected to be resistant to the contents of the cell and the external environment, to be able to form and maintain a compression seal between the can 110 and cup 120, to be essentially impermeable to the cell electrolyte, and to have a suitably low transmission rate for gases such as oxygen. Typically the gasket material is a polymeric material, and it may be a thermoplastic and/or an elastomeric polymer. Examples of materials that may be suitable include nylons, polyethylene, polypropylene, polyphthalamide, polystyrene, polysulfone, polytetrafluoroethylene, fluorinated ethylene-propylene.

It may be desirable to place a sealant material on at least some surfaces of the gasket to provide an improved seal between sealing surfaces that are not perfectly smooth (e.g., having a rough texture or imperfections such as scratches, nicks, projections and depressions). Sealants can fill lower areas in the surface that may otherwise provide a leakage path for liquids and gases between adjacent sealing surfaces. Any suitable sealant known in the art may be used.

One embodiment of the invention is a round or prismatic cell whose maximum external height between the can base and the cup base is less than the maximum external width of the can. The first electrode is an air electrode (a catalytic electrode that reduces oxygen contained in air that enters the cell from the external environment), and the second electrode contains a metal such as zinc, aluminum, magnesium or lithium.

Another embodiment is a prismatic metal air cell, which can include electrode and electrolyte materials similar to a button metal air cell.

Another embodiment of the invention is a button alkaline cell. One electrode (typically the first electrode) can contain a positive electrode active material such as silver oxide or mercuric oxide, and the other electrode (typically the second electrode) contains zinc and an aqueous alkaline electrolyte.

Another embodiment of the invention is a nonaqueous coin cell. One electrode (typically the first electrode) contains a positive electrode active material such as manganese dioxide, iron disulfide, copper oxide or carbon monofluoride; the other electrode (typically the second electrode) contains a negative electrode active material such as lithium, and the electrolyte is a nonaqueous electrolyte including an organic solvent.

Yet another embodiment of the invention is a rechargeable cell such as a nickel cadmium, nickel zinc, nickel hydrogen, silver oxide, zinc manganese dioxide, lead acid, lithium or lithium ion cell.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. An electrochemical battery cell comprising:
   a first electrode;
   a second electrode;
   an electrolyte; and
   a cell housing comprising:
   an electrically conductive metal can;
   an electrically conductive metal cup; and
   a gasket disposed between the can and the cup in which the electrodes, separator and electrolyte are disposed, wherein the first electrode is in contact with the can, and the second electrode is in contact with the cup,
   wherein:
   each of (a) the can, (b) the cup, and (c) the gasket includes a base and a peripheral wall extending from the base,
   the peripheral wall of the cup having a cup edge portion at an end disposed away from the base of the cup defining an open end,
   the peripheral wall of the gasket is disposed between and sealingly engaged with the peripheral wall of the can and the peripheral wall of the cup, with the peripheral wall of the can disposed on an outside of the peripheral wall of the gasket, the cup disposed on an inside of the peripheral wall of the gasket,
   the base of the gasket extends between an inner edge and an outer edge, the peripheral wall of the gasket extends away from the outer edge of the gasket base, the gasket terminates at the inner edge of the of the gasket base, both the edge portion of the cup and the base of the gasket extend inward toward the center of the first electrode, away from the peripheral wall of the can such that the inner edge of the gasket base and the edge portion of the cup are at an angle that is at least 45° and less than 90° relative to a longitudinal axis of the cell housing, an inner surface of the base of the gasket is substantially parallel to an outer surface of the edge portion of the cup, the base of the can is disposed so as to, with the gasket, sealingly enclose the open end of the cup, the cup edge portion applies a biasing force toward the base of the can, and a surface of the cup edge portion is sealingly engaged with the base of the gasket.

2. The battery cell of claim 1, wherein the biasing force biases the base of the gasket against the first electrode and the biasing force biases the base of the gasket against the base of the can.

3. The battery cell of claim 1, wherein the cup comprises a plated cup.

4. The battery cell of claim 1, wherein the cell comprises a round or prismatic cell whose maximum external height between the can base and the cup base is less than the maximum external width of the can.

5. The battery cell of claim 1, wherein the first electrode is a positive electrode and the second electrode is a negative electrode.

6. The battery cell of claim 1, wherein the cell comprises a metal air cell, and the positive electrode is a catalytic oxygen reduction electrode, the negative electrode comprising a metal selected from zinc, aluminum and a lithium, or an alloy thereof, the electrolyte comprising an aqueous electrolyte.

7. The battery cell of claim 1, wherein both the edge portion of the cup and the base of the gasket extend inward toward the center of the first electrode such that the outer surface of the edge portion of the cup is in contact with the inner surface of the base of the gasket.

8. The battery cell of claim 1, wherein the thickness of the base of the gasket is no greater than 0.20 mm.

9. The battery cell of claim 1, wherein the thickness of the base of the gasket is no greater than 0.15 mm.

10. The battery cell of claim 1, wherein the edge portion of the cup is configured to provide a spring force to apply a biasing force against the gasket base.

* * * * *